United States Patent Office.

JACKSON B. WOOD. OF RICHMOND, VIRGINIA.

Letters Patent No. 114,502, dated May 2, 1871.

IMPROVEMENT IN COMPOSITIONS FOR MANUFACTURE OF SODA-WATER.

The Schedule referred to in these Letters Patent and making part of the same.

I, JACKSON B. WOOD, of Richmond, county of Henrico and State of Virginia, have invented a new and useful Compound, of which the following is a full, clear, and exact specification.

This invention relates to the manufacture, in a new way, of a popular drink, known all over the world as soda-water.

The object of my invention is—

First, to prepare a true and genuine soda-water in such form as to render it unnecessary for persons to visit a so-called soda-fountain in order to obtain a glass of this refreshing beverage.

Secondly, to so cheapen the article as to place it within the power of all who may choose to do so to use it.

As to the first point, it is deemed unnecessary here to say that the fluid now vended under the name of soda-water is a misnomer, since it is a fact well known to the initiated that there is oftener than otherwise no soda used in preparing it. In truth, it may be stated, as a general proposition, that there is not a grain of soda contained in a ten-gallon fountain of this so-called soda-water; it is simply aerated water— that is, a mixture of water and carbonic-acid gas.

My purpose is, then, to substitute the complicated, cumbrous, and expensive apparatus used in the preparation and sale of this pseudo soda-water with a compound powder containing all the elements for its production, by the use of which every person may manufacture his own soda-water, and have a genuine article besides.

This I propose to do by a mixture of the purest supercarbonate of soda, the purest tartaric acid, powdered white sugar, pure albumen, fluid-extracts, essential oils, and fruit-juices, prepared in the proportions and in the mode hereinafter mentioned.

Take of pure tartaric acid, ten pounds; pure supercarb. soda, nine pounds; powdered white sugar, eighty pounds; odorized albuminous sugar, five pounds. Mix all thoroughly together.

The albuminous sugar introduced here is prepared by triturating the white of eggs with powdered sugar, and carefully drying, so as to drive off every particle of moisture and render it homogeneous with the sugar used in its preparation, thus preventing its coagulation by the acid when brought in juxtaposition with it in the mixture.

The odorized sugar is prepared by a similar process, using, in addition to the albumen, fluid-extracts, essential oils, and the juice of fresh, ripe fruit; and is used dry, as a flavoring for the compound, the first or albumen being used to impart a foaming and sparkling effect, according to the quantity used in the mixture.

The several articles are all mixed and thoroughly sifted together, put up in tight tin or card packages of convenient size for popular use, which I propose to denominate condensed soda-water, to be used as the basis of other popular drinks under other names, if necessary or expedient to do so, as, also, for all culinary purposes to which it may be found applicable from the nature of any of its component parts.

I make no reference to the various preparations which may have been put up in the past, either in single or double powders, since my preparation bears no resemblance to them, save that there may have been used the same kind of alkali and acid.

With a given quantity of my powder, when prepared—say, one-half ounce to four or six ounces of water, (iced,)—is produced a glass of sparkling, foaming, and pleasantly flavored soda-water not inferior to that drawn from the fountain, and an excellent adjunct to the administration of medicine.

I claim as my invention—

1. The herein-described compound called condensed soda-water, prepared by mixing together an alkaline carbonate and a solid acid with sugar, flavoring material, and albumen, or its equivalent, as set forth.

2. The albumenized sugar, prepared in the manner described.

3. The flavor, made by combining sugar, albumen, and flavoring material, as specified.

J. B. WOOD.

Witnesses:
 JAMES E. BELL,
 WM. CROSSFIELD.